United States Patent [19]

She et al.

[11] Patent Number: 5,635,706
[45] Date of Patent: Jun. 3, 1997

[54] DIRECT CONVERSION X-RAY/GAMMA-RAY PHOTOCATHODE

[75] Inventors: Yongzheng She; Fonglan Ji, both of Shanghai, China; Wei-Lou Cao; Meizhen Zhang, both of Prince Georges County, Md.; Yanhua Shih, Howard County, Md.; Roger H. Schneider, Montgomery County, Md.

[73] Assignee: CSL Opto-Electronics Corporation, Ellicott City, Md.

[21] Appl. No.: 622,169

[22] Filed: Mar. 27, 1996

[51] Int. Cl.⁶ .................. H01J 31/50; G21K 4/00
[52] U.S. Cl. .................. 250/214 VT; 313/103 CM
[58] Field of Search .................. 250/214 VT, 207, 250/370.09, 370.08; 378/98, 98.2, 98.3, 98.8; 313/103 CM, 103 R, 104, 105 R, 105 CM

[56] References Cited

U.S. PATENT DOCUMENTS

| | | | |
|---|---|---|---|
| 3,681,606 | 8/1972 | Tinney | 250/214 VT |
| 4,040,900 | 8/1977 | Mazzarella et al. | 162/158 |
| 4,104,516 | 8/1978 | Wang et al. | 250/241 VT |
| 4,140,900 | 2/1979 | Wang | 250/214 VT |
| 4,255,666 | 3/1981 | Wang et al. | 250/214 VT |
| 4,300,046 | 11/1981 | Wang | 378/62 |
| 4,413,280 | 11/1983 | Adlerstein et al. | 378/98 |
| 5,225,670 | 7/1993 | She et al. | 250/214 VT |
| 5,285,061 | 2/1994 | She et al. | 250/214 VT |
| 5,351,279 | 9/1994 | She et al. | 378/43 |
| 5,365,056 | 11/1994 | Sklebitz et al. | 250/214 VT |

*Primary Examiner*—Edward P. Westin
*Assistant Examiner*—John R. Lee
*Attorney, Agent, or Firm*—Whitham, Curtis, Whitham and McGinn

[57] ABSTRACT

A direct conversion broad band x-ray/gamma-ray photocathode having at least one layer functioning as an efficient x-ray or gamma-ray absorber and another layer functioning as an efficient transmission secondary electron emitter for providing both high detection efficiency and high spatial resolution, for use in either a radiation detection environment or an image intensification environment.

9 Claims, 2 Drawing Sheets

DIRECT CONVERSION X-RAY/GAMMA-RAY PHOTOCATHODE

BACKGROUND OF THE INVENTION

1. Field of the Invention

The present invention generally relates to radiation detectors and image intensifiers and, more particularly, to composite photocathodes in radiation detectors and image intensifiers for directly converting x-ray and gamma-ray radiation imagery into electron imagery.

2. Background Description

X-ray to visible light converters are well known in the art, but generally use indirect conversion techniques where x-ray energy is converted to visible light in a scintillator and the visible light (photons) is then converted to a corresponding electron image. In the instance of an image intensifier, the secondary electrons can be multiplied in a microchannel plate or accelerated by an electric field before striking a phosphor display screen to provide an enhanced directly viewable visible image. There are numerous disadvantages in having to convert an x-ray image to a visible light image before generating and multiplying a corresponding electron image. Conversion of an x-ray image to a visible light image is normally accomplished by using a scintillator, as is well known in the art and as described in U.S. Pat. No. 4,104,516, 4,140,900, 4,255,666 and 4,300,046. In each instance, the scintillator exhibits a limited response time, poor spatial resolution, and due to the complicated fabrication techniques and the attendant requirement to use light shielding, it becomes extremely expensive to fabricate.

The x-ray to electron converter referenced above will not function with gamma-ray radiation. Gamma-ray imaging systems utilize very sophisticated techniques which contain a plurality of scintillators and photomultipliers; therefore, the imaging system becomes unduly complicated and cost prohibitive. One of the primary reasons that the development of gamma-ray image intensifiers have not paralleled the x-ray image intensifiers is that the gamma-rays have much higher photon energy than x-rays and, in the case of indirect conversion techniques as used in x-ray image intensifiers, the scintillator must be thicker for gamma rays than that of an x-ray detector, and under these conditions the light spreads in the thicker scintillator and the spatial resolution becomes severely degraded, rendering it impossible to provide useful spatial information. There are two counter productive principles existing in the fabrication of prior imaging detectors for high energy photons; i.e., the thicker the scintillator, the higher the quantum detection efficiency, but the worse the spatial resolution becomes.

While the prior art has reported various types of x-ray/gamma-ray to electron converters, none have dealt specifically with resolving the specific problem of providing a high efficiency, direct conversion x-ray or gamma-ray photocathode.

SUMMARY OF THE INVENTION

The primary objective of this invention lies in the development of a radiation responsive photocathode that will function to directly convert an x-ray or gamma-ray radiation image to an electron image. The photocathode essentially consists of a microchannel plate having an x-ray or gamma-ray absorbing layer, and an electron emissive layer deposited within the channels over the absorbing layer. The incoming radiation is absorbed in the radiation absorbing layer and as the radiation photons penetrate the absorbing layer, primary electrons are liberated and move substantially at right angles to the direction of the incoming radiation photons and strike the electron emissive layer, where secondary electrons are released to provide a multiplication effect. As the secondary electrons are liberated into the open channels of the microchannel array, an electric field accelerates the movement of the electrons along the longitudinal axis of the channel and, as the secondary electrons move along the channel, they continuously strike the sides of the channel wall releasing more electrons to enhance the multiplication effect to provide a very efficient photocathode.

It is a further object of the invention to provide a universal method of preparing a radiation imaging detector with both high detection efficiency and high spatial resolution.

Another object of the invention is to provide a radiation photocathode having a choice of several various materials with a geometrical configuration that would be suitable for various applications in radiation detection and/or imaging devices.

It is still another object of the invention to provide a gamma-ray photocathode having a special geometrical configuration with a specially selected gamma-ray absorber, having a high quantum detection efficiency and high spatial resolution, for use in a gamma-ray image intensifier or radiation detector.

In the instant case, a special geometrical configuration was designed for the radiation photocathode, such that the absorption of x-ray and gamma-ray photons occurs in one direction and the emission of photoelectrons can occur in a range of directions around 90 degrees from the direction of the incoming radiation photons. The effective absorption of the photons, and hence the conversion efficiency of the secondary electron emissive layer, will be enhanced considerably when high energy photoelectrons strike the electron emissive layer normal to the surface. The emitted primary electrons will pass through an efficient transmission secondary emitter to produce multiple secondary electrons with low energy, and these electrons (mostly secondary electrons with low emission energy) can be confined to the channel array, thus providing the capability of achieving a very high spatial resolution.

It has been found that the fabrication of the x-ray photocathode is best accomplished by utilizing two separately functioning layers; one acting as an x-ray absorber, which may be fabricated of a compound of high atomic number materials, and the other acting as a transmission secondary electron emitter, which detects the energetic primary electrons produced in the first part of the photocathode. Therefore, the compounds may be selected containing elements of high atomic number materials as an effective x-ray absorber and use the special geometrical configuration of the photocathode to enhance the effective radiation photon absorption.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
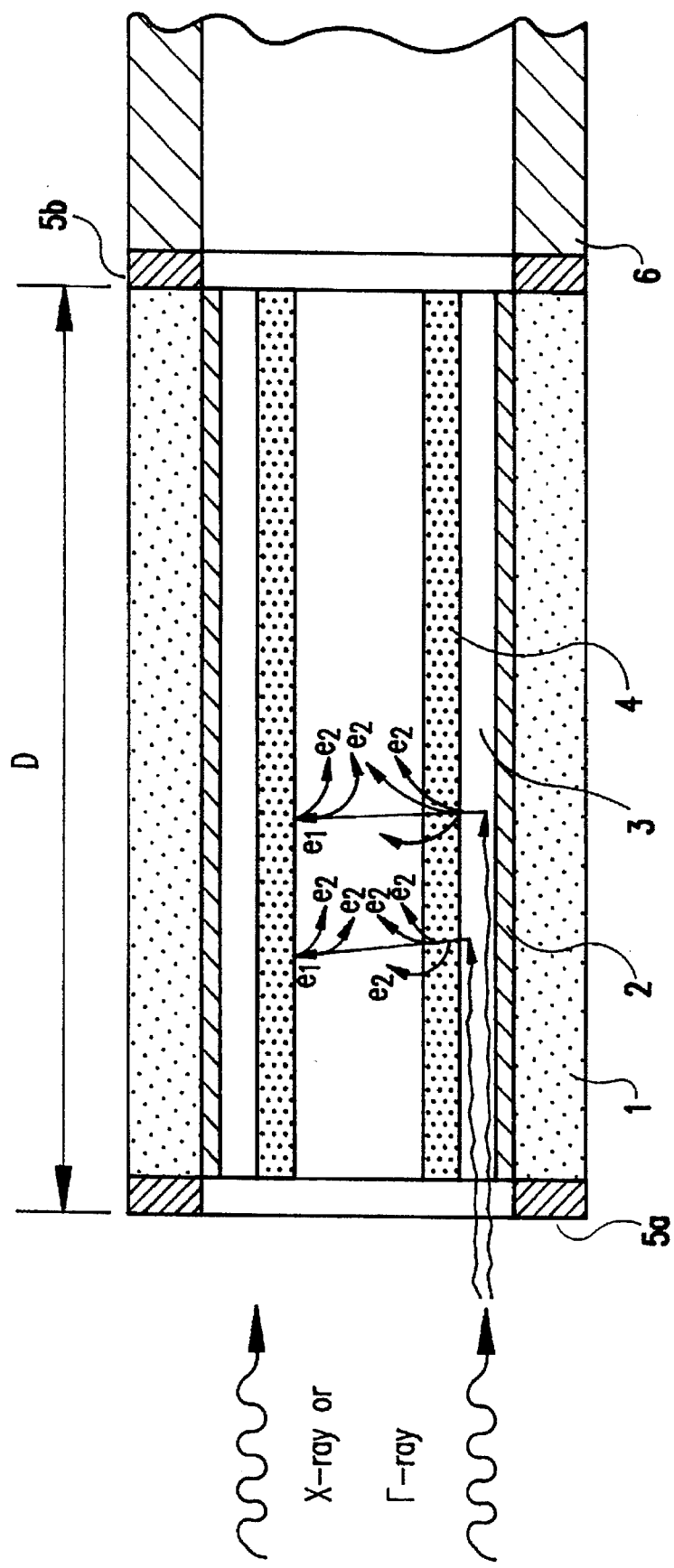
FIG. 1 is a cross-sectional view showing the high efficiency composite x-ray or gamma-ray photocathode of this invention.

Referring now to the drawings, and more particularly to FIG. 1, there is shown a diagram of the composite x-ray photocathode with a generalized flow diagram of the path of input radiation photons and the resultant photoelectrons liberated in the absorber, along with a trace of the secondary electrons liberated in the secondary electron emissive layer. Element 1 is a channel wall, which may be made of glass, ceramic or any material that is consistent with the materials of which a microchannel plate is fabricated. In the case of a standard microchannel plate, as used in an infrared (IR) image intensifier for example, the walls are made of a lead glass referred to as 8161 glass made by Corning Glass. Element 2 is a semiconducting layer of material most generally composed of chromium oxide ($Cr_2O_3$) or thin film of aluminum. The resistance of the layer for single channel should fall within the range of $10^{13} - 10^{15}$ ohms. Layer 3 is a semiconducting layer of a photon absorbing material comprising a compound with an element having a high atomic number selected primarily from the elements Pb, Bi, and Tl combined in compounds such as PbO, $Bi_2O_3$, TlBr, PbS, and $Bi_2S_3$. The thickness (width) of this layer depends on the x-ray photon energy to be detected. Should the x-ray photon to be detected, have an energy of 60 Kev, as the typical medical diagnostic x-ray photon, the optimum thickness of PbO would be about 5–6 microns, and 5.5–6 microns for $Bi_2O_3$, etc. The optimum thickness of the radiation absorbing layer 3 can be adjusted to a suitable width in accordance with the incident radiation impinging on the photocathode. Layer 4 is a high efficiency transmission secondary electron emitter which can be made from various high efficiency secondary emissive materials primarily selected from the group comprising CsI, CsBr, MgO, KCl and KI. The optimum thickness of the transmission secondary electron emitter is dependent on the x-ray photon energy. In the case of CsI, with an x-ray photon energy of 60 Kev, the optimum thickness ranges from 6.5 to 7.5 microns, with the x-ray photon absorber being PbO or $Bi_2O_3$. The thickness of the layers may be selected to suit the various energies of the x-ray photon. Element 5a and 5b are electrodes, such that when the x-ray photocathode is operating, there is an electric field generated between the input and output ends of the photocathode by means of a bias voltage applied across the electrodes. Element 6 is a proximity focused cascaded microchannel plate to further multiply the secondary electrons from the x-ray photocathode.

In operation, an x-ray beam is incident onto the photocathode, x-rays are absorbed effectively in the absorbing layer 3, and as representatively shown, the radiation photons penetrate the absorption layer 3 and liberate photoelectrons at an approximate 90 degree angle to the direction of the incident photons. As the photoelectrons travel through the secondary electron emissive material 4, secondary electrons are liberated, and they themselves will strike other electrons, liberating them from the material. The photoelectrons or primary electrons, as alternatively referred to, are high energy electrons and penetrate the wall of the electron emissive material 4 and strike the other side of the channel, to subsequently release even more electrons, as shown in the trace of FIG. 1 as $e_2$. The secondary electrons are of somewhat less energy than the primary electrons and are propagated down the length of the channel by an electric field generated by the application of a voltage applied across the photocathode at electrodes 5a and 5b. The energetic primary electrons produced in the absorber 3 have a high probability of escaping from layer 3. The escape depth of primary photoelectrons are only several microns in this instance; therefore, primary electrons produced in layer 3 can incident into layer 4 with high efficiency. Through the collision with the electrons in layer 4, multiple secondary electrons are produced, owing to the fact that the thickness of layer 4 is optimized for the emission of secondary electrons. The secondary electrons produced have a high probability of being emitted into the channel. Upon the application of the electric field, the electrons emitted from layer 4 can be the resultant of secondary electrons liberated from the electron emissive material or from the photoelectrons liberated by the photoelectrons impacting the opposite channel wall. The outer surface of opposite channel wall is also a high efficiency secondary electron emitter; therefore, the electron impact on the opposite wall will result in additional electron multiplication, just as the process occurs in normal microchannel plate. For 60 Kev x-ray photon, the length or thickness of the photocathode D is 0.2 mm, while the thickness of PbO layer 3 is 5.5 microns, with the thickness of the electron emissive layer 4 of CsI, being 7.0 microns. Where the photon energy of the input radiation x-rays is greater or less than that selected above, the optimum values of D, the thickness of the absorbing layer 3 and the thickness of the electron emissive layer 4 will be selected in accordance with the criteria necessary to match the photon energy to the specific materials. As necessary, the materials of which the various layers are constructed may also be changed. This type of x-ray photocathode may be useful in very wide energy region of x-ray photons and in each case may achieve the highest detection efficiency.

Another example would be to construct the entire photocathode with a channel diameter of 30 microns, a channel pitch (distance between channel centers) of 38 microns, the thickness of the channel "framework" of 0.2 ram, a layer of PbO of 5.5 microns and a layer of CsI of 7.0 microns, then this structure of x-ray photocathode would achieve a high quantum detection efficiency at the 60 Key x-ray photon level. For other x-ray photon energies, the parameters listed above can be changed to meet the highest x-ray detection efficiency. The intrinsic spatial resolution of this x-ray photocathode may be higher than 14 Ip/mm. The configuration of FIG. 1 may also represent a composite gamma-ray photocathode, for the essential components in gamma-ray photocathode are as same as in a composite x-ray photocathode. One only need control the thickness of the various layers to maximize the operation thereof. In the case of a gamma-ray photocathode, one must concern him or herself with the larger photon energy, the photocathode length D and the thickness of the PbO layer and CsI layer, which would be significantly increased. Length D and the thickness of PbO layer and CsI layer are increased many times. For 511 Kev gamma-ray which, which is produced by positron annihilation, D may selected as long as 1 cm, the channel diameter would be on the order of 100 microns, the thickness of PbO would be about 20 microns and the thickness of CsI layer would be as great as 25 microns. It appears that a microchannel plate with a channel diameter of 100 microns, with a length of 1 cm, and a PbO content in glass of 50%, that a detection efficiency of 13% for 511 Kev gamma-ray photon can be expected If the PbO content in glass is raised to 70%, the detection efficiency would increase to about 40%.

Figure 2:
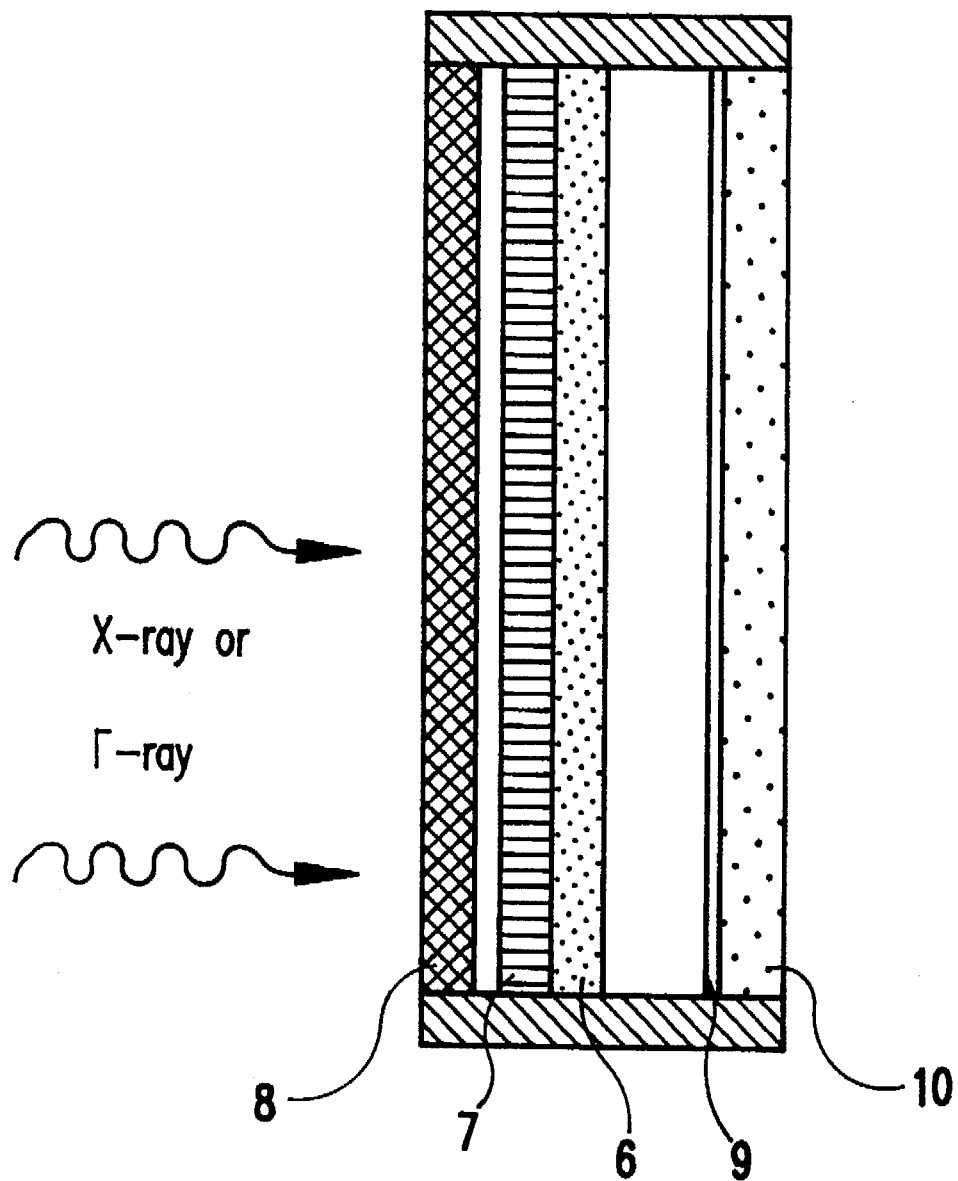
FIG. 2 is a schematic diagram of a panel type x-ray, gamma-ray image intensifier based on a composite x-ray or gamma-ray photocathode according to the invention.

FIG. 2 is a schematic diagram of a panel type x-ray or gamma-ray image intensifier, with element 8 being an input window. The window is made of 0.1 mm to 0.25 mm titanium foil, with the thickness depending on the useful viewing field of the image intensifier. The thin Ti foil reduces the scattering of the incident x-rays and has an excellent transmission coefficient. Element 7 represents the photocathode as described in FIG. 1, and element 6 is a microchannel plate used to multiply the photoelectron output by the photocathode. In order to restrict the ion-feedback to the photocathode 7, the microchannel plate 6 has channels deviating from the axis of the photocathode by an angle of approximately 13°–15° when the axis of the photocathode channel is in the same direction as the incident x-ray or gamma-ray radiation. Element 9 is an output display fluorescent screen prepared on a glass window 10. Optionally, when electronic sensing of the detected radiation is desired, element 9 may be an electrode which is segmented in an appropriate pattern, if position sensing is to be achieved, and continuous if position sensing is not desired. In operation, the voltage of input surface of element 7 ranges between −1400 v to −2000 v, the output surface of element 7 at −1000 v to −1200 v, the input surface of the element 6 is at the same voltage as the output surface of element 7. With the output surface of the microchannel plate grounded (v=0), the voltage of the output display fluorescent screen should be around +6000 v to +8000 v. The brightness of the image can be as high as 30 cd/m$^2$. The useful diameter of the panel type x-ray and gamma-ray image intensifier can be made from 15 mm to 200 ram, with the thickness smaller than 6 cm. This panel type x-ray and gamma-ray intensifier has 1:1 input and output image ratio and vacuumed to 5 ×10$^{-8}$ torr in a glass or ceramic envelope.

While the invention has been described in terms of a single preferred embodiment implemented with alternative materials, those skilled in the art will recognize that the invention can be practiced with modification within the spirit and scope of the appended claims.

Having thus described our invention, what we claim as new and desire to secure by Letters Patent is as follows:

1. A direct conversion composite radiation photocathode comprising:

a microchannel array aligned in the longitudinal direction with the direction of the incident radiation and having an input and an output on respective ends of the longitudinal array;

a layer of radiation photon absorbing material disposed inside of each channel for receiving incident photons at the input end of said array for absorbing the photons in the longitudinal direction;

a layer of electron emissive material disposed on the layer of radiation photon absorbing material; and biasing means coupled across the photocathode for effecting an electric field along the longitudinal axis of the photocathode, the radiation photon absorbing material absorbing the incident radiation photons to a depth determined by energies of the respective photons, whereupon the radiation photons reach a prescribed depth and liberate high energy photoelectrons at substantially right angles to the direction of incident radiation, such that the photoelectrons strike and penetrate the layer of electron emissive material, thus liberating a plurality of secondary electrons which are accelerated along the longitudinal axis of each channel within the channel array, which in turn strike the layer of electron emissive material to provide a multiplication effect to greatly enhance a stream of electrons emitted at the output of each photocathode channel corresponding to the radiation photons incident at the input of each respective photocathode channel in the array.

2. The composite radiation photocathode of claim 1, wherein the layer of radiation photon absorbing material is selected from the group of materials comprising PbO, B$_2$O$_3$, TlBr, PbS, and Bi$_2$S$_3$, and the layer of electron emissive material is selected from the group of materials CsI, CsBr, MgO, and KCl.

3. The composite radiation photocathode of claim 2, wherein the photocathode is an x-ray photocathode fabricated for incident radiation on the order of a 60 Kev x-ray photon input, the thickness of the photocathode being approximately 0.2 mm with a channel diameter of approximately 30 microns, a photon absorbing layer of PbO having a thickness of approximately 5.5 microns, and an electron emissive layer of CsI being approximately 7.0 microns, to achieve an intrinsic spatial resolution of at least 14 lp/mm.

4. The composite radiation photocathode of claim 2, wherein the photocathode is a gamma-ray photocathode fabricated for an incident radiation on the order of a 511 Key gamma-ray photon input, the width of the photocathode being approximately 1 cm, the channel diameter being on the order of 100 microns, a layer of PbO, as the photon absorbing layer, having a thickness of approximately 20 microns, and a thickness of an electron emissive layer of CsI being approximately 25 microns.

5. A panel type radiation image intensifier comprising:

a composite radiation photocathode comprising a microchannel array aligned in the longitudinal direction with the direction of the incident radiation and having an input and an output on respective ends of the longitudinal array, a layer of radiation photon absorbing material disposed inside of each channel for receiving incident photons at the input end of said array for absorbing the photons in the longitudinal direction, the layer of radiation photon absorbing material being selected from the group of materials comprising PbO, Bi$_2$O$_3$, TlBr, PbS, and Bi$_2$S$_3$, a layer of electron emissive material disposed on the layer of radiation photon absorbing material, the layer of electron emissive material is selected from the group of materials CsI, CsBr, MgO, and KCl, and biasing means coupled across the photocathode for effecting an electric field along the longitudinal axis of the photocathode, the radiation photon absorbing material absorbing the incident radiation photons to a depth determined by energies of the respective photons, whereupon the radiation photons reach a prescribed depth and liberate high energy photoelectrons at substantially fight angles to the direction of incident radiation, such that the photoelectrons strike and penetrate the layer of electron emissive material, thus liberating a plurality of secondary electrons which are accelerated along the longitudinal axis of each channel within the channel array, which in turn strike the layer of electron emissive material to provide a multiplication effect to greatly enhance a stream of electrons emitted at the output of each photocathode channel corresponding to the radiation photons incident at the input of each respective photocathode channel in the array;

a thin Ti foil input faceplate deposited on the input surface of the photocathode;

a microchannel plate coupled to the output end of the photocathode to multiply the photoelectrons generated in the photocathode;

a proximity focused output fluorescent display faceplate coupled to the output side of the microchannel plate; and a vacuum tight enclosure encompassing all the above elements in a cascade fashion, such that the input window and the output faceplate is open to receive the input radiation and to provide a visible image on the output faceplate corresponding to any radiation photon image impinging on the input faceplate.

6. A panel type x-ray image intensifier comprising:
a composite radiation photocathode comprising
   a microchannel array aligned in the longitudinal direction with the direction of the incident radiation and having an input and an output on respective ends of the longitudinal array,
   a layer of radiation photon absorbing material disposed inside of each channel for receiving incident photons at the input end of said array for absorbing the photons in the longitudinal direction,
   a layer of electron emissive material disposed on the layer of radiation photon absorbing material, and
   biasing means coupled across the photocathode for effecting an electric field along the longitudinal axis of the photocathode, the radiation photon absorbing material absorbing the incident radiation photons to a depth determined by energies of the respective photons, whereupon the radiation photons reach a prescribed depth and liberate high energy photoelectrons at substantially fight angles to the direction of incident radiation, such that the photoelectrons strike and penetrate the electron emissive material, thus liberating a plurality of secondary electrons which are accelerated along the longitudinal axis of each channel within the channel array, which in turn strike the layer of electron emissive material to provide a multiplication effect to greatly enhance a stream of electrons emitted at the output of each photocathode channel corresponding to the radiation photons incident at the input of each respective photocathode channel in the array;
   a thin Ti foil input faceplate deposited on the input surface of the photocathode;
a microchannel plate coupled to the output end of the photocathode to multiply the photoelectrons generated in the photocathode;
a proximity focused output fluorescent display faceplate coupled to the output side of the microchannel plate; and
a vacuum tight enclosure encompassing all the above elements in a cascade fashion, such that the input window and the output faceplate is open to receive the input radiation and to provide a visible image on the output faceplate corresponding to any x-ray photon image impinging on the input faceplate.

7. A panel type gamma-ray image intensifier comprising:
a composite radiation photocathode comprising
   a microchannel array aligned in the longitudinal direction with the direction of the incident radiation and having an input and an output on respective ends of the longitudinal array,
   a layer of radiation photon absorbing material disposed inside of each channel for receiving incident photons at the input end of said array for absorbing the photons in the longitudinal direction,
   a layer of electron emissive material disposed on the layer of radiation photon absorbing material, and
   biasing means coupled across the photocathode for effecting an electric field along the longitudinal axis of the photocathode, the radiation photon absorber receives incident radiation photons upon radiating the photocathode, the radiation photo absorbing material absorbing the incident radiation photons to a depth determined by energies of the respective photons, whereupon the radiation photons reach a prescribed depth and liberate high energy photoelectrons at substantially right angles to the direction of incident radiation, such that the photoelectrons strike and penetrate the layer of electron emissive material, thus liberating a plurality of secondary electrons which are accelerated along the longitudinal axis of each channel within the channel array, which in turn strike the layer of electron emissive material to provide a multiplication effect to greatly enhance a stream of electrons emitted at the output of each photocathode channel corresponding to the radiation photons incident at the input of each respective photocathode channel in the array;
a thin Ti foil input faceplate deposited on the input surface of the photocathode;
a microchannel plate coupled to the output end of the photocathode to multiply the photoelectrons generated in the photocathode;
a proximity focused output fluorescent display faceplate coupled to the output side of the microchannel plate; and
a vacuum tight enclosure encompassing all the above elements in a cascade fashion, such that the input window and the output faceplate is open to receive the input radiation and to provide a visible image on the output faceplate corresponding to any gamma-ray photon image impinging on the input faceplate.

8. A panel type x-ray detector comprising:
a composite radiation photocathode comprising
   a microchannel array aligned in the longitudinal direction with the direction of the incident radiation and having an input and an output on respective ends of the longitudinal array,
   a layer of radiation photon absorbing material disposed inside of each channel for receiving incident photons at the input end of said array for absorbing the photons in the longitudinal direction,
   a layer of electron emissive material disposed on the layer of radiation photon absorbing material, and
   biasing means coupled across the photocathode for effecting an electric field along the longitudinal axis of the photocathode, the radiation photon absorbing material absorbing the incident radiation photons to a depth determined by energies of the respective photons, whereupon the radiation photons reach a prescribed depth and liberate high energy photoelectrons at substantially fight angles to the direction of incident radiation, such that the photoelectrons strike and penetrate the layer of electron emissive material, thus liberating a plurality of secondary electrons which are accelerated along the longitudinal axis of each channel within the channel array, which in turn strike of the layer of electron emissive material to provide a multiplication effect to greatly enhance a stream of electrons emitted at the output of each photocathode channel corresponding to the radiation photons incident at the input of each respective photocathode channel in the array;
a thin Ti foil input faceplate deposited on the input surface of the photocathode;
a microchannel plate coupled to the output end of the photocathode to multiply the photoelectrons generated in the photocathode;

electron collector means coupled to the output of the microchannel plate for collecting the electrons exiting the microchannel plate to provide an output signal indicative of the presence of x-ray radiation.

9. A panel type gamma-ray detector comprising:

a composite radiation photocathode comprising
- a microchannel array aligned in the longitudinal direction with the direction of the incident radiation and having an input and an output on respective ends of the longitudinal array,
- a layer of radiation photon absorbing material disposed inside of each channel for receiving incident photons at the input end of said array for absorbing the photons in the longitudinal direction,
- a layer of electron emissive material disposed on the layer of radiation photon absorbing material, and
- biasing means coupled across the photocathode for effecting an electric field along the longitudinal axis of the photocathode, the radiation photon absorbing material absorbing the incident radiation photons to a depth determined by energies of the respective photons, whereupon the radiation photons reach a prescribed depth and liberate high energy photoelectrons at substantially right angles to the direction of incident radiation, such that the photoelectrons strike and penetrate the layer of electron emissive material, thus liberating a plurality of secondary electrons which are accelerated along the longitudinal axis of each channel within the channel array, which in turn strike the layer of electron emissive material to provide a multiplication effect to greatly enhance a stream of electrons emitted at the output of each photocathode channel corresponding to the radiation photons incident at the input of each respective photocathode channel in the array;

a thin Ti foil input faceplate deposited on the input surface of the photocathode;

a microchannel plate coupled to the output end of the photocathode to multiply the photoelectrons generated in the photocathode;

electron collector means coupled to the output of the microchannel plate for collecting the electrons exiting the microchannel plate to provide an output signal indicative of the presence of gamma-ray radiation.

* * * * *